INVENTOR
GABRIEL FUENTES, JR.
Dominik, Stein & Knechtel
ATTY'S

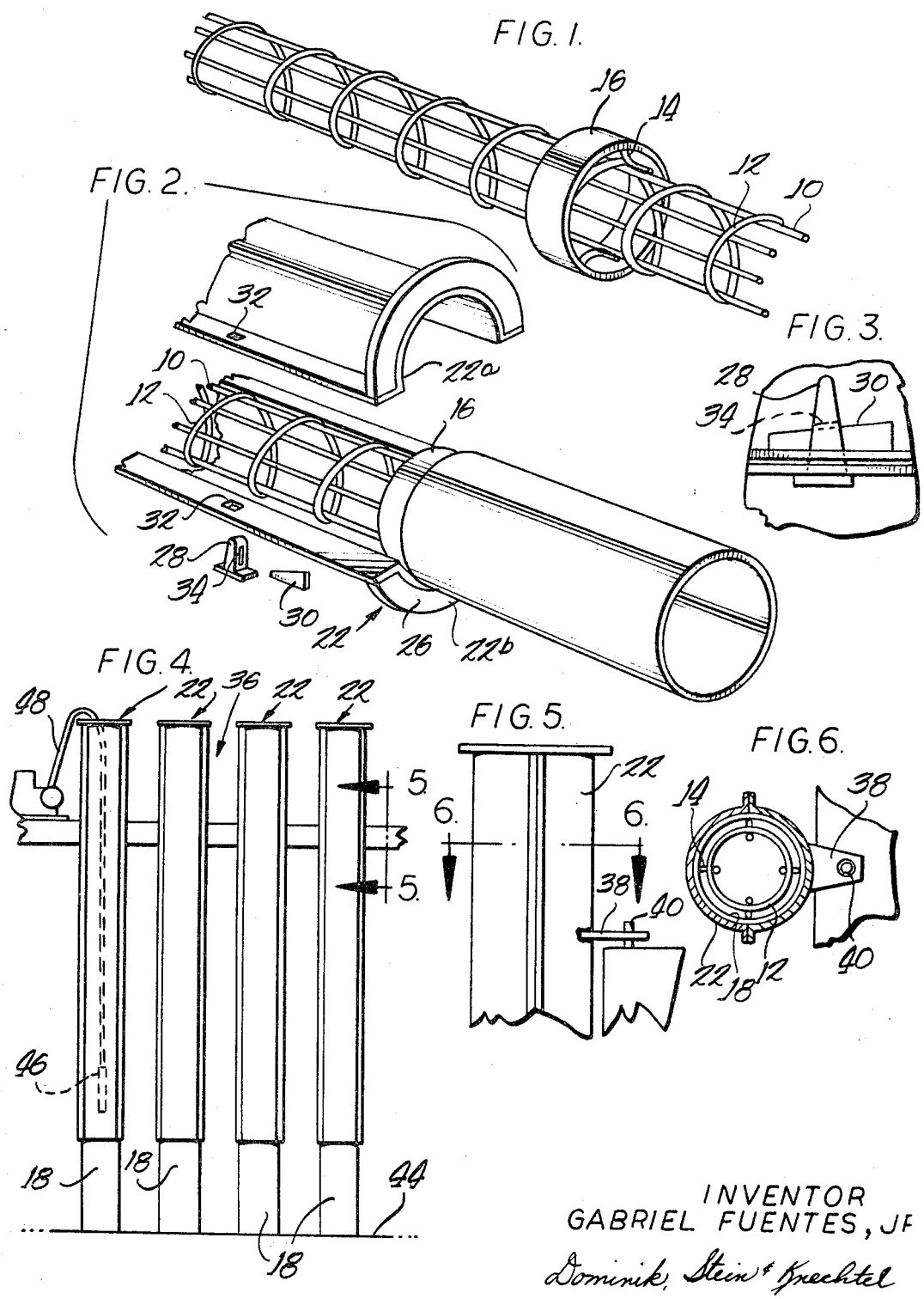

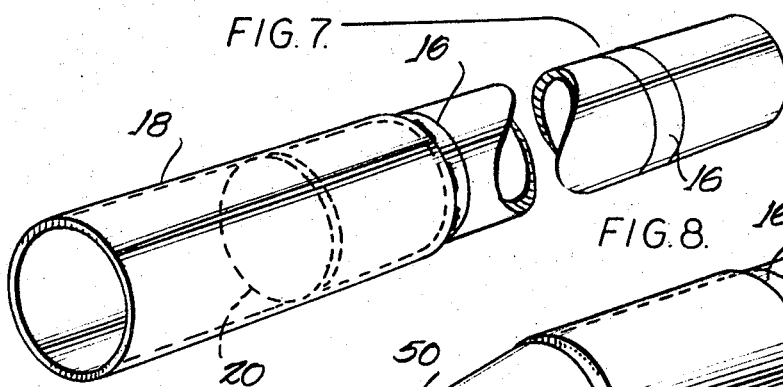
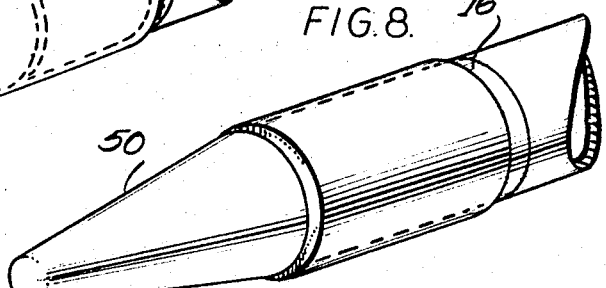
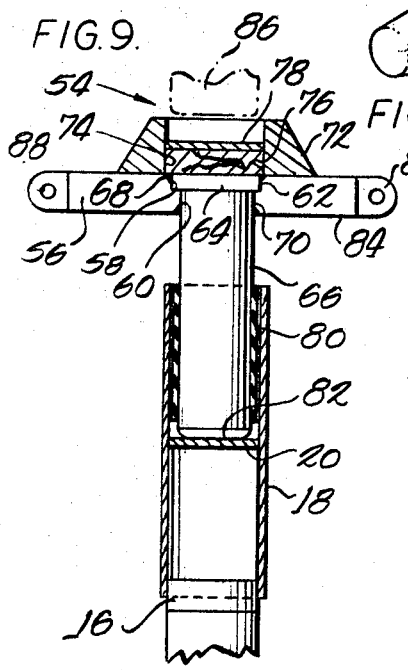
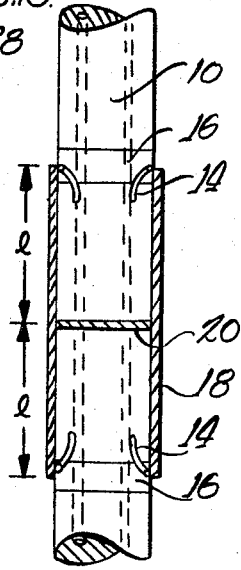
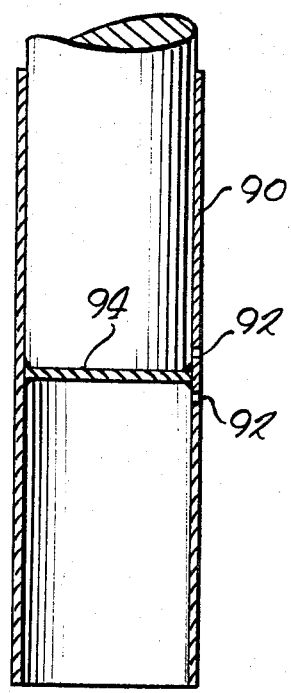
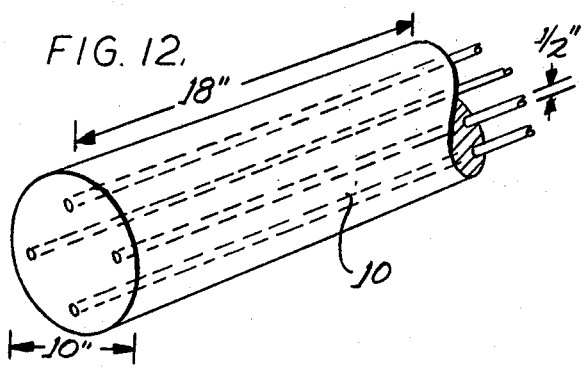
INVENTOR
GABRIEL FUENTES, JR.
ATTY'S June 17, 1969 G. FUENTES, JR 3,449,918
CONCRETE PILES AND METHODS AND APPARATUS FOR
FORMING AND SPLICING THEM TOGETHER
Filed Jan. 13, 1967 Sheet 3 of 4

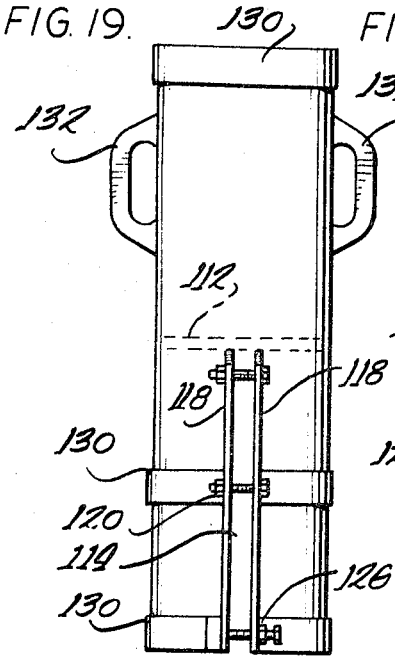
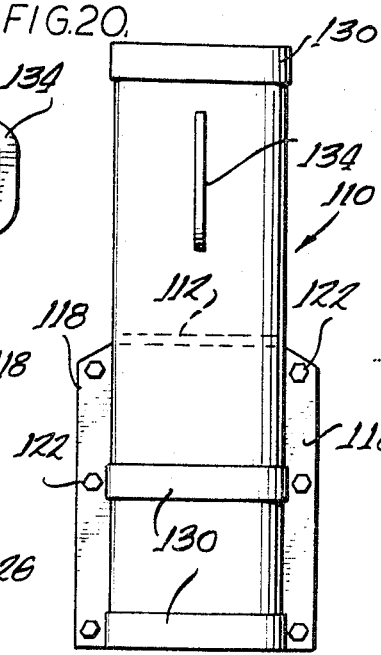
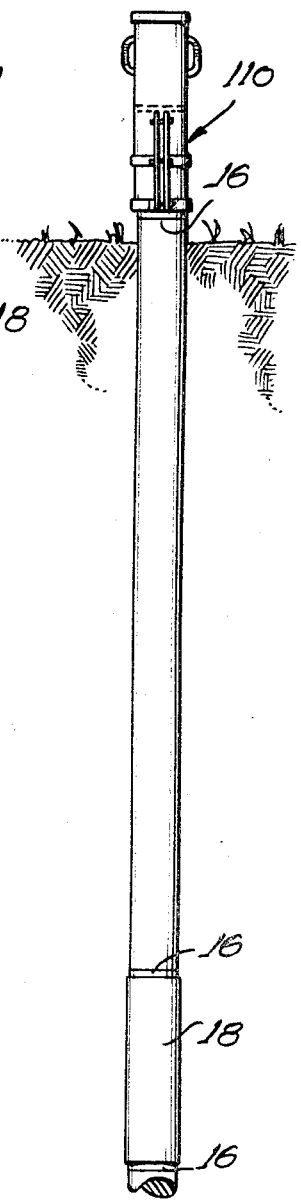
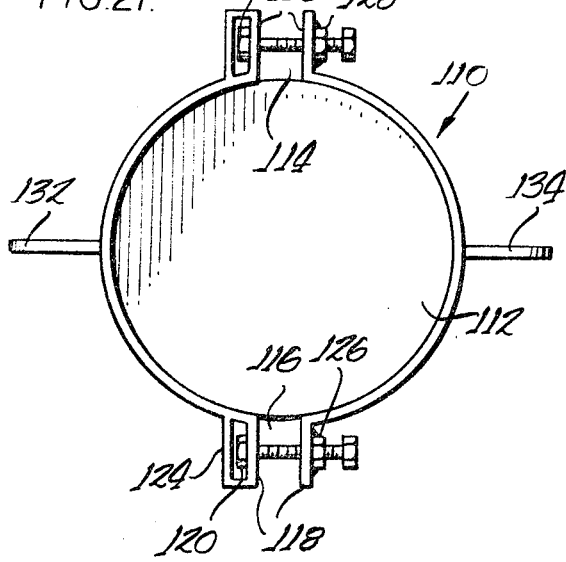
INVENTOR
GABRIEL FUENTES, JR.
ATTY'S

United States Patent Office 3,449,918
Patented June 17, 1969

3,449,918
CONCRETE PILES AND METHODS AND APPARATUS FOR FORMING AND SPLICING THEM TOGETHER
Gabriel Fuentes, Jr., 1501 Ashford Ave., Apt. 7–B, Santurce, Puerto Rico 00911
Filed Jan. 13, 1967, Ser. No. 609,102
Int. Cl. E02d 5/30, 7/06, 5/52
U.S. Cl. 61—56        1 Claim

ABSTRACT OF THE DISCLOSURE

A reinforced concrete pile section which can be spliced to another pile section. Each section is reinforced with longitudinally prestressed reinforcing rods and is cast vertically to orient the concrete. In one embodiment, each end of each section has an annular ring. In splicing sections together, a tubular sleeve is telescoped over the ends and its edges affixed to the rings. The sleeve completely encompasses and confines the concrete preventing shattering of the same while being driven. In a second embodiment, the sleeve is telescoped over the ends and bonded to the section with adhesive.

The tubular sleeve has a central transverse plate to completely enclose each pile section.

A special mandrel, which does not damage the pile section, is used as a driving means. It has a resilient liner and is centrally supported within the sleeve.

A tubular, tapered end pile section which can be conveniently shipped and/or stored and which can be affixed to the ring of the first pile section is used at the driving end of the pile section. A removable sleeve is affixed to the end of the last pile section for driving it.

---

This invention relates to improved reinforced concrete pile sections which can be spliced and to improved methods and apparatus for driving said pile sections.

Considerable effort has been expended to develop improved reinforced concrete pile sections which can be easily spliced and also driven into the ground without damage. While a pile section can be fabricated in a fashion such that it may be used to support either a compression or a tension load, the present practice is to fabricate sections for only one particular type of load. Accordingly, pile sections of both types are stocked. This is obviously undesirable from an inventory viewpoint.

In driving and splicing the pile sections, the ability to do one job is, to a great degree, directly dependent upon the other. In many cases, a pile section can be easily driven however, its hammered end is damaged so that a good splice cannot be made. If the end of the pile section is repaired, a considerable delay in completing a job may result since the concrete used to repair the damaged end must be allowed to cure. It is generally recommended or required that a pile section be allowed to cure for approximately 28 days after being cast, so that it has sufficient strength. Conversely, many pile sections can be easily spliced but cannot be easily driven.

Several methods disclosed by the prior art have generally succeeded to some degree in solving the above problems, however, each of them is unsatisfactory for one reason or another. For example, U.S. Patent 1,073,614 discloses a pile splice in the form of a tubular sleeve which is telescoped over the ends of the two pile sections which are to be spliced together. The sleeve is fixedly secured to the pile sections by means of bolts extended through the sleeve and the ends of the pile sections. In attempting to use this pile splice, it is found that the bolts tend to shear the concrete and damage the ends of the pile sections. The splice is therefore unreliable, particularly when the pile is used with a tension load, since the damaged ends may cause the splice to part. Such a possibility cannot be tolerated.

U.S. Patent 2,698,519 likewise discloses a pile splice employing a sleeve which is fitted about the ends of the two pile sections to be secured together. In this patent, however, the ends of the sleeve are welded to a metal ring formed integrally with respective ones of the pile sections. The disclosed splice is generally a very good splice, however, the piles are subjected to considerable damage when being driven. The inventor recognizes the fact that the ends of the pile sections are damaged and proposes to overcome this deleterious result by affixing the ends of the reinforcing rods in the pile sections to the rings. With this arrangement, it is stated, "The force of the driving blows applied by the hammer to the upper end of the pile is transmitted from section to section through the auxiliary reinforcing rods, the rings and the sleeve so that any spalling which may have occurred or may occur in the concrete at the ends of the pile sections will not effect proper driving conditions."

Accordingly, with the disclosed splice, spalling still occurs and, for this reason, the splice has not found acceptance by the trade. The mere fact that the possibility of spalling is present is enough reason to reject the splice as unreliable.

U.S. Patent 2,698,220 discloses another similar pile splice using a plate at the ends of each of the two pile sections to be affixed together. This splice has several objectionable features, one of which is the lack of good alignment for driving. Another is that the peripheral welding exhibits problems on close dimensional tolerances. Still another is the fact that the pile sections require a special mandrel to drive them.

Other patents relating to the fabrication, driving and splicing of concrete pile sections also are available, however, like those specifically mentioned above, each of them suffers some undesirable and objectionable features.

Accordingly, it is an object of the present invention to provide improved reinforced concrete pile sections.

Another object is to provide improved methods for fabricating reinforced concrete pile sections so as to increase the strength of the pile sections, particularly in the direction of the load imposed upon them.

Still another object is to provide improved means for splicing reinforced concrete pile sections together, whereby a number of pile sections can be spliced together to form a continuous pile of predetermined length.

Still another object is to provide improved methods for forming reinforced concrete pile sections whereby they may be readily spliced together.

A still further object is to provide improved splices and methods for effecting said splices whereby the ends of the pile sections are not subject to damage upon being driven.

A still further object is to provide improved end section concrete pile sections and methods for forming them whereby they may be more easily and more economically stored and shipped. It is further contemplated that the improved end section concrete pile sections can be more easily driven and spliced.

A still further object is to provide a sleeve which can be removably affixed to the end of, for example, the last pile section to be driven, for driving it and for protecting it against damage.

Still another object is to provide a removable sleeve of the above type which can be re-used.

Other objects of the invention will in part be obvious and will in part appear hereinafter.

The invention accordingly comprises the several steps and the relation of one or more of such steps with respect to each of the others, the apparatus employing features of construction, combinations and arrangement of parts which are adapted to effect such steps, and the product which possesses the characteristics, properties and relation of elements, all as exemplified in the detailed disclosure hereinafter set forth, and the scope of the invention will be indicated in the claims.

For a fuller understanding of the nature and objects of the invention, reference should be had to the following detailed description taken in connection with the accompanying drawings, in which:

FIG. 1 is a perspective view illustrating the manner in which the reinforcing rods and the annular ring are affixed together, prior to placing the same within a mold for casting the pile section;

FIG. 2 is a partial perspective view illustrating the manner in which the assembly of FIG. 1 is placed within a mold;

FIG. 3 is a view illustrating the wedges used to affix or lock the mold sections together;

FIG. 4 is a partial front plan view of a platform for vertically supporting the molds for casting the pile sections;

FIG. 5 is a partial side view, taken along lines 5—5 of FIG. 4, illustrating the manner in which the molds are supported on the platform;

FIG. 6 is a sectional view, taken along lines 6—6 of FIG. 5;

FIG. 7 is a partial perspective view of a cast reinforced concrete pile section, after removal from the mold;

FIG. 8 is a partial perspective view illustrating a pile section having a tapered, substantially pointed end section affixed to it;

FIG. 9 is a partial sectional view of a pile section and the mandrel, illustrating the construction of the mandrel and further illustrating the manner in which the mandrel is disposed within the sleeve to drive a pile section;

FIG. 10 is a partial sectional view of two piles, illustrating the manner in which the splice is effected;

FIG. 11 is a partial sectional view illustrating an alternative manner for effecting a splice, using an adhesive to bond the sleeve to the pile sections;

FIG. 12 is a partial perspective view of a pile section, illustrating the manner in which the reinforcing rods are disposed within the sleeve to drive a pile section;

FIGS. 19 and 20 are side plan views of a sleeve adapted to be removably affixed to the end of a pile section;

FIG. 21 is a top plan view of the sleeve of FIGS. 19 and 20; and

FIG. 22 is a plan view illustrating the sleeve of FIGS. 19-21 affixed to a pile which has been driven.

Similar reference characters refer to similar parts throughout the several views of the drawings.

Figure 13:
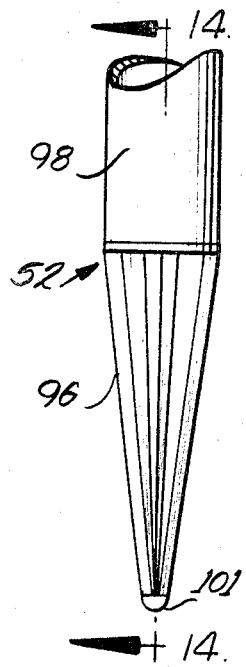
FIG. 13 is a plan view of an end section, fabricated in accordance with a preferred embodiment of the invention.
Figure 14:
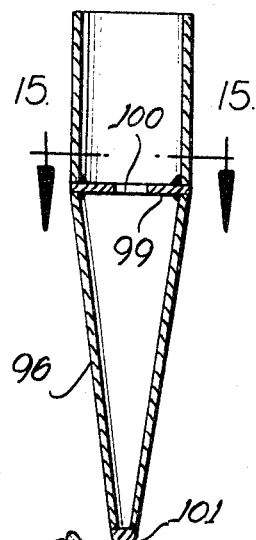
FIG. 14 is a sectional view taken along lines 14—14 of FIG. 13.
Figure 15:
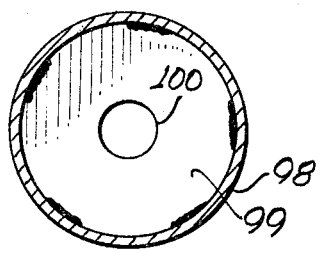
FIG. 15 is a sectional view taken along lines 15—15 of FIG. 14.
Figure 16:
FIG. 16 is an end view illustrating the fluted tapered portion of the end section of FIG. 13.

Referring now to the drawings, in FIGS. 1-7 there is illustrated a preferred manner of fabricating reinforced concrete pile sections in accordance with the present invention. The standard, casted pile sections are generally approximately 10 inches in diameter and 20 feet in length, with ½-inch metal, preferably steel, reinforcing rods imbedded in them, however, other diameters and lengths can be cast also. In the description below, the pile sections are of the standard size but it will be apparent that the methods of fabricating the pile sections and of splicing them together are equally applicable to any size pile section.

A number of reinforcing rods 10 are longitudinally disposed and fixedly secured in any suitable fashion, to a helically wound reinforcing rod 12, in spaced relation about is periphery. Shorter auxiliary reinforcing rods 14 are affixed to the reinforcing rods 10 and the ends thereof are bent outwardly and fixedly secured to an annular metal ring 16. A ring 16 is affixed to each end of the rods 10, approximately 18 inches from the ends thereof, for reasons set forth below. The rings 16 have an outer diameter or surface conforming to the shape of the outer surface of the pile sections of which they form a part.

In accordance with a preferred embodiment, a tubular sleeve 18 having a plate 20 fixedly secured therein, preferably centrally thereof, is next telescoped over the ring 16 so as to contain approximately ½ of the ring therein and its peripheral edge is fixedly secured to the ring preferably by welding it. Alternatively, the sleeve 18 can be telescoped over the pile section after it is formed and then affixed to the ring 16 in the same fashion, if desired. With the preferred embodiment, however, a complete, ready-to-use pile section can be more easily and quickly formed since it eliminates the need to thereafter affix the sleeve. Also, if the sleeve is affixed to the pile section after it is formed, a holding form and pressure means in the form of, for example, a hydraulic jack or piston, is required to force the sleeve over the end of the pile section. Accordingly, by affixing the sleeve to the ring in the preferred manner, considerable time and equipment is saved, both of which constitute a financial savings so that the cost of the pile section can be reduced.

The minimum length "l" (FIG. 10) of the sleeve 18 should be equal to 24 times the diameter of the reinforcing bars used, regardless of the number of reinforcing bars used, in order to effect a good splice. For example, when using ½-inch reinforcing bars, regardless of the number of reinforcing bars used, the length "l" of the sleeve 18 should be at a minimum 12 inches. If you are using ¾-inch reinforcing rods, the minimum length "l" of the sleeve 18 should be at a minimum 18 inches. When using a standard pile section, the sleeve 18 preferably has a length "l" of 18 inches, or a total length of 36 inches and the rings 16 accordingly are affixed to the reinforcing rods 10 at least 18 inches from their opposite ends, to provide an additional safety factor. The rings 16, however, could be affixed within a range of 12 inches to 15 inches from the opposite ends of the reinforcing rods and still meet most accepted standards for adequate bonds between steel and concrete. Therefore, while the length "l" of the sleeve 18 can be anywhere within the range of 12 to 18 inches, a length "l" of 18 inches is preferably used, to provide the additional safety factor.

After affixing a sleeve to one of the rings, the whole assembly is placed within a form 22 which is preferably a split form having two complimentary semi-circular shaped form members 22a and 22b. While a circular shaped pile is preferred, it will be appreciated that other shapes such as oval, square, rectangular and the like, can be provided, if desired, merely by providing a form of the corresponding shape. The assembly is placed in one of the form members 22, with the end of the sleeve 18 abutted against the flange 26 at the end thereof. In other words, the sleeve 18 extends beyond the end of the form 22. The other half of the form 22 is then placed atop the form member holding the assembly, and the two halves affixed together by means of fastening means, such as the wedges 28 and 30 shown in FIG. 3. The wedge 28 is extended through apertures 32 in the form members 24, and has an aperture 34 through which is extended the wedge 30 to lockingly secure the wedge 28 in the apertures 32 and the two form members 24 together.

The forms 22 are supported upon a platform 36, in a vertically disposed position, as illustrated in FIG. 4, for filling with concrete. For this purpose, one of the form members 24 has an apertured flange 38 fixedly secured to it which is adapted to hook with an upstanding pin 40 affixed to an upper frame member 42 of the platform, as illustrated in FIG. 5. When vertically disposed, the end of the sleeve 18 rests on a base 44 of the platform, or upon the ground. Concrete is poured into the forms 22 (including the portion of the sleeve 18 above the plate 20 therein), and simultaneously the concrete is agitated by means of a vibrator 46 which is affixed to the end of a hose 48 and extended into the forms. As the level of concrete in the forms rises, the vibrator 46 is withdrawn so that the concrete is vibrated or agitated from the bottom to the top of the forms, as it is deposited.

The pile sections are preferably cast in the described fashion to orient the concrete in the same direction in which it will carry a load. Experimentation and testing of these pile sections has shown them to be far superior in strength and capacity to support both compression and tension loads than those which are cast horizontally, rolled or spun. Accordingly, by casting the pile sections vertically and agitating the concrete from the bottom to the top of the form as it is deposited, the same pile sections can be used both for compression loads and for tension loads.

After casting the pile sections, they are permitted to set in the forms and, once set, they are removed and permitted to cure for a predetermined period of time, generally 28 days. Upon being removed from the forms 22, the pile sections appear as illustrated in FIG. 7. It may be noted that the one end of the pile section extends into the sleeve 18 and the peripheral edge of the sleeve is fixedly secured to the ring 16. The opposite end of the pile section has the ring 16 imbedded in it, at a predetermined fixed distance from its end. As indicated, however, the sleeve 18 could be affixed to the pile section after it has been cast, if desired.

The first driven pile section preferably has a metal, tapered, substantially pointed tip 50 affixed to its one end, as illustrated in FIG. 8. The tip 50 may be hollow and its open end inserted within and welded to the sleeve 18 affixed to a pile, as illustrated in FIG. 8, or alternatively, an end section 52, of the type illustrated in FIG. 13 and described more fully below, can be used.

The pile section is vertically supported, in any suitable fashion, and driven into the ground using a mandrel. A mandrel 54 of the type illustrated in FIG. 9 can be advantageously used and is preferred, to prevent damaging the sleeve 18 affixed to the end of the pile section. The mandrel 54 has a generally circular shaped body portion 56 which has two concentric apertures 58 and 60 formed in it. The apertures 58 extends only partly through the body portion and provides a shoulder 62 for the enlarged diameter end portion 64 of the mandrel pin 66, while the diameter of the aperture 60 substantially corresponds to the diameter of the mandrel pin 66. In assembling the mandrel pin 66 in the body portion 56, the body portion is preferably heated and the mandrel pin cooled before the mandrel pin is extended through the apertures 58 and 60. Thereafter, the body portion 56 is quickly cooled in any suitable fashion such as by dipping the assembly in ice water, so that it is caused to rapidly contract or shrink. In this manner, the mandrel pin 66 is generally "clamped" by the body portion 56 so that it is fixedly secured therein. For additional strength, the body portion and the mandrel are welded to one another, as illustrated at 68 and 70. A truncated cone-shape top member 72 is next affixed centrally with the body portion 56, by welding it to the body portion about its peripheral edge. The top member 72 has an aperture 74 in it which is slightly larger than the aperture 58, and a wooden cushion 76 of a corresponding diameter seats within in it, atop the enlarged diameter portion 64 of the mandrel pin 66. A steel plate 78 also seats within the aperture 74, atop the cushion 76 to protect it. The mandrel pin 66 has a generally resilient liner 80 of rubber or plastic integrally formed about it. The outer diameter of the liner 80 affixed to the mandrel pin preferably substantially corresponds to the inner diameter of the splicing sleeves 18 affixed to the end of the pile sections so that the mandrel pin fits snugly within the sleeves. Also, the length of the mandrel pin 66 from its lower end 82 to the underside 84 of the body portion 56 is longer than the distance from the plate 20 within the sleeve 18 to the opened end thereof. With this construction, the mandrel pin 66 is snugly held within the sleeve 18 during driving and the sleeve 18 as well as the end of the pile section is prevented from being damaged. The ram 86 for driving the pile sections pounds against the steel plate 78. A pair of apertured flanges or eyes 88 can be affixed to the body portion 56, for attaching to the driving apparatus to support the mandrel 54 during driving and to transport or move it.

In FIG. 9, it can be seen how the pile sections are driven. The mandrel pin 66 is inserted in the open end of the sleeve 18, with the end 82 thereof in engagement with the plate 20 and the sleeve 18. The liner 80 in the mandrel pin 66 provides a relatively close snug fit so that the mandrel pin is positionally supported substantially centrally within the sleeve 18. Of primary importance is the fact that the lower surface 84 of the body portion 56 of the mandrel does not engage the upper peripheral edge of the sleeve 18 when the pile section is driven so that the edge of the sleeve is not damaged. Since the upper edge thereof is not bent or distorted, the end of another pile section can be easily inserted into the sleeve to form the splice. Of equal importance is the fact that the end of the mandrel pin 66 strikes the plate 20 and not the exposed end of the pile section, as in the Lloyd patent supra, during driving. Furthermore, it may be noted that the end of the pile section is completely confined within the sleeve 18, by means of its side walls and the plate 20. This construction prevents the end of the pile section from spalling and, in fact, virtually prevents the end of the pile section from being damaged in any fashion when being driven.

The pile sections also are easily and quickly driven into the ground since the force of the driving blows is transmitted from section to section through the auxiliary reinforcing rods 14, the longitudinal reinforcing rods 10, the rings 16 and the sleeves 18.

After a pile section is driven to the depth of the sleeve 18, the end of another pile section is inserted into the open end of the sleeve 18 and thereafter the peripheral edge of the sleeve is welded to the ring 16 to complete the splice, as illustrated in FIG. 10.

Testing has shown that pile sections constructed and driven in the described manner can be easily driven and spliced, and that the splices are far superior than those which heretofore were generally provided since neither the ends of the pile sections or the ends of the sleeves are subjected to any damage. Accordingly, the disclosed construction of the sleeve and the manner in which the pile sections are driven provide both a new, and better method for driving pile sections and a new, stronger and more efficient joint or splice for permanently securing together the sections of piles.

In FIG. 11 there is illustrated an alternative manner for splicing the pile section securely together, using an adhesive preferably an epoxy resin to effect a bond between the pile sections and a sleeve 90. The sleeve 90 is of generally the same construction as the sleeve 18, the only difference being in the provision of small weep holes 92 in the sleeve side wall just above and below the plate 94 therein. The weep holes 92 permit any excess adhesive to leak out of the sleeve 90 so that the end of the pile section abuts tightly against the plate 94. When using this splice, the sleeve 90 is, of course, affixed to the pile section after it has been cast. The end of the pile section is coated with the adhesive and the sleeve is then telescoped over it. The pile section can either be used immediately or it can be stored until the adhesive has hardened or cured, to effect the bond. After the pile section is driven and a splice is to be made, the end of the pile section to be spliced to it is likewise coated with the adhesive and then inserted into the sleeve 90. Driving can be continued immediately, or after the adhesive has set.

As illustrated in FIG. 12, the bond that the reinforcing rods 12 have with the pile section is limited in the area of the splice section to the contact surface of the reinforcing rods. When using ½-inch reinforcing rods and with the ring 16 positioned 18 inches from the end of the splice section, this contact area is equivalent to the circumference of the rods times 4 times 18 inches, or 118 square inches. The contact area of the sleeve 90 to the concrete is equivalent to the circumference of the sleeve times 18 inches, or 565 square inches. Accordingly, there is approximately a 5:1 ratio in contact surface and any adhesive which provides a specific shear resistance equal to ⅕ that between the rods and the concrete will transmit the load. Therefore, any adhesive which will provide this bond between the sleeve and the pile can be used.

In FIGS. 13–18, there is illustrated a pile section 52 which can be advantageously used in combination with the above described pile sections, as the first pile section to be driven. The pile section 52 is fabricated of steel, in tubular form, and has a tapered section 96 with a fluted cross section (as can be best seen in FIG. 16) and a generally cylindrical end 98. A plate 99 having an aperture 100 centrally formed in it is fixedly secured within the cylindrical end so that the cylindrical end 98 generally resembles and functions in the same fashion as ½ of a sleeve 18. Accordingly, the plate 99 is fixed at a depth which permits the end of a pile section to be inserted in the cylindrical end 98 and its peripheral edge welded to the ring 16 on the pile section. The end of the pile section preferably abuts against the plate 99 when assembled, in the same fashion as the end abuts against the plate 20 in the sleeves 18. A pointed tip 101 is welded to the opposite end of the tapered section 96 to close it and to permit the pile section to be more easily driven.

Figure 17:
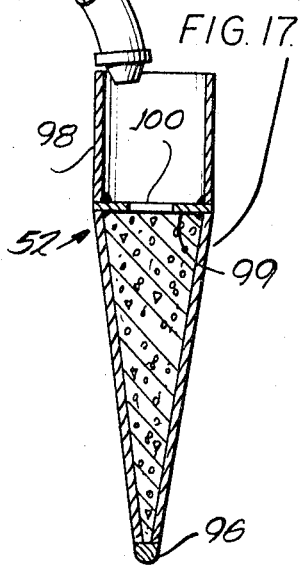
FIG. 17 is a sectional view illustrating the manner in which the end section of FIG. 13 is filled with concrete.
Figure 18:
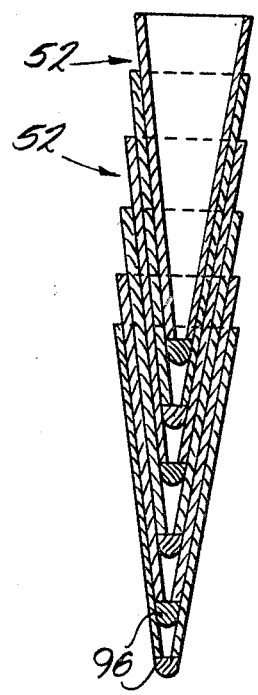
FIG. 18 is a sectional view illustrating the manner in which a number of the end sections of FIG. 13 can be stacked within one another for shipping and storing them.

In storing or shipping the pile sections 52, a number of them can be easily stacked telescopically within one another, as illustrated in FIG. 18. Accordingly, the pile sections 52 can be economically shipped and with considerable savings in space in comparison with similar pile sections presently available. Before being used, the pile sections 52 are filled with concrete, through the aperture 100 in the plate 99, up to the bottom of the plate 99, as illustrated in FIG. 17. After being filled, the concrete is allowed to set.

To drive the pile section 52, it is vertically supported and the mandrel pin 66 placed in the cylindrical end 98 and abutted against the plate 99, in the manner described above in driving a pile section with a sleeve 18 affixed to it.

In FIGS. 19–21, there is illustrated a sleeve 110 which is adapted to be removably affixed to the end of a pile section, generally the last pile section to be driven. The uppermost section requires a sleeve only during the time it is being driven, and does not require a permanent sleeve because further splicing is not contemplated. Construction engineers who are skilled in the art of pile driving usually can predict the approximate length of the pile required, after one or more pile sections have been driven. Their predictions generally are based on soil conditions and knowledge acquired from previous piles driven in that area. Accordingly, having determined how many pile sections are necessary, a removable sleeve can be affixed to the last pile section for driving it.

The sleeve 110 is of the same size as the sleeve 18 but it is preferably constructed of a heavier material so that it is more resistant to damage and can be used many times. The sleeve 110 also has a centrally positioned plate 112 in it which is thicker than the plate 20 so as to resist wear. The lower section of the sleeve (as illustrated) is split and has a pair of diametrically disposed slots 114 and 116 formed in it which extend from its lower edge to the plate 20. Flanges 118 are affixed along the edges of the slots 114 and 116 and have apertures formed in them for receiving fastening means such as the nut 120 and bolt 122 for tightly clamping the end of the sleeve about a pile section. The nuts 120 advantageously can be affixed, by welding, to the flanges 118 to prevent them from being lost, and the bolts 122 of sufficient length so that they do not have to be completely removed from the flanges to remove the sleeve. The bolts 122 are therefore less likely to be lost also. One of the nuts 120 and bolts 122 can be affixed to the flanges 118, as illustrated in FIG. 21, to provide an arrangement to force the end of the sleeve 110 apart to facilitate removal of the sleeve after the pile has been driven. A box or abutment 124 is affixed about the end of the bolt 122 and is engaged by the end of the bolt as the latter is threaded into the nut 126 affixed to the opposite flange. The nut 120 is affixed to the end of the bolt 122 so that the bolt functions to clamp the sleeve about the pile when it is threaded through the nut 126 to pull against the flange 118. Reinforcing bands 130 can be provided for additional strength, if desired. A pair of handles 132 and 134 can be affixed to the upper part of the sleeve, for assisting in lifting the sleeve off of the pile.

The sleeve 110 is affixed to a pile by inserting the end of the latter into the split end of the sleeve until it abuts the plate 112. Thereafter, the nuts 120 and bolts 122 are tightened to clamp the sleeve tightly about the end of the pile. The sleeve encompasses and confines the end of the pile, in the same fashion as the sleeves 18, so as to prevent the end of the pile from being damaged during driving.

After the pile is driven, the sleeve 110 is removed by loosening the nuts 120 and bolts 122. Spreading of the sleeve to facilitate removal is assisted by the action of the nuts 120 abutting against the abutment 124 so that the sleeve can be easily removed by lifting it with the handles 132 and 134.

It can therefore be seen that the sleeve 110 saves considerable expense since it can be re-used. Also, its use does not preclude the attachment of a permanent sleeve, such as a sleeve 18, onto the end of a pile in the event the original prediction is found to be in error. Since the end of the pile is not damaged, the temporary sleeve can be removed and a permanent sleeve easily attached in the field, thereby permitting additional sections to be spliced to the original pile.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the inventon, which, as a matter of language, might be said to fall therebetween.

Now that the invention has been described, what is claimed is:

1. A concrete pile section comprising an elongated length of cast concrete having a plurality of longitudinal reinforcing rods embedded within it, an annular band-like metal ring secured to said pile section a fixed distance from the end thereof, the outer surface of said ring conforming to the contour of the outer surface of said pile section, the ends of certain ones of said reinforcing rods being fixedly secured to said ring, a tubular metal sleeve having an interior cavity sized to fit tightly about the exterior surface of said pile section and having a plate fixedly secured therein dividing said sleeve into two compartments, said sleeve being affixed to one end of said pile section with said plate abutted against the terminal end thereof, the end of said sleeve overlapping and being welded to said ring to fixedly secure said sleeve to said pile section, whereby said pile section can be driven by engaging a mandrel with said plate within said sleeve to thereby substantially eliminate damaging the end of said pile section and said pile section can be spliced to another pile section by receiving the end of the other pile section within the other of the two compartments within said sleeve and welding the end of said sleeve to the metal ring on the other pile section.

References Cited

UNITED STATES PATENTS

| | | | |
|---|---|---|---|
| 911,971 | 2/1909 | Gilbreth | 61—56 X |
| 955,729 | 4/1910 | Welsh | 61—53.7 |
| 1,073,614 | 9/1913 | McDearmid | 61—53 |
| 1,558,127 | 10/1925 | Upson | 61—53.5 |
| 2,698,519 | 1/1955 | Lloyd | 61—56 |
| 2,983,104 | 5/1961 | Bruns | 61—56 |
| 2,996,887 | 8/1961 | Rice et al. | 61—53.7 |
| 3,046,749 | 7/1962 | Blessey | 61—56 |
| 3,187,513 | 6/1965 | Guild | 61—53.5 |
| 3,211,241 | 10/1965 | Kikuchi | 173—131 |
| 3,307,362 | 3/1967 | Cravens et al. | 61—53 X |

FOREIGN PATENTS 1,954,070  4/1934  Cook.

OTHER REFERENCES

Progressive Architecture, August 1959, pp. 138–140.

JACOB SHAPIRO, *Primary Examiner.*

U.S. Cl. X.R.

61—53, 53.5, 53.7; 173—131; 264—32